May 31, 1960 — R. McFEE — 2,938,390
INTEGRATING ACCELEROMETER
Filed April 30, 1956 — 2 Sheets-Sheet 1

INVENTOR
R. McFEE
BY John C. Morris
ATTORNEY

May 31, 1960     R. McFEE     2,938,390
INTEGRATING ACCELEROMETER
Filed April 30, 1956     2 Sheets-Sheet 2

INVENTOR
R. McFEE
BY John C. Morris
ATTORNEY

United States Patent Office

2,938,390
Patented May 31, 1960

2,938,390
INTEGRATING ACCELEROMETER

Richard McFee, Morris Plains, N.J., assignor to Bell Telephone Laboratories, Incorporated, New York, N.Y., a corporation of New York Filed Apr. 30, 1956, Ser. No. 581,403

1 Claim. (Cl. 73—516)

This invention relates to accelerometers and more particularly to accelerometers for indicating the integral sum of the accelerations to which the accelerometer is subjected.

In certain systems, as for example, in inertial navigation systems, it is necessary to obtain an indication of the integral sum of each of the several components of the applied accelerations. From this indication the velocity may be determined. By integrating the velocity, a determination may be made of the total distance traversed.

Accordingly, it is an object of this invention to provide an accelerometer which will produce a continuous indication of the integral of the acceleration to which the device has been subjected.

It is a further object of this invention to provide an integrating accelerometer of a simple design and more particularly a design which does not include rotating parts.

In one form of this invention a glass capillary tube is in the form of a loop having a straight section. The tube is filled with a suitable electric conducting fluid, such as mercury, except for a small gap located in the straight section. When the tube is accelerated in a direction coincident with the axis of the straight portion of the loop a pressure unbalance results from the absence of the fluid in the gap. This unbalance, in combination with the cohesiveness of the mercury, causes the gap to move in the direction of the acceleration. This movement of the gap may be viewed as a tendency to "float" in the direction of the acceleration. The rate at which the gap moves is determined by the pressure difference resulting from acceleration along the tube axis and by the retarding viscous friction. It can be shown that the viscous friction is directly proportional to the rate of flow, and thus it follows that the mercury, as represented by the gap, moves through the tube at a rate proportional to the acceleration and, therefore, is displaced by an amount proportional to the integral of the acceleration.

A continuous indication of the position of the gap in the mercury column relative to the center, or zero position, may be obtained readily by electrical means. In one specific embodiment the mercury column itself acts as a one turn secondary of a transformer with the primary excited by alternating current. By treating the mercury in the straight portion of the tube and on each side of the gap as capacitor plates, a bridge circuit may be provided which will produce an output indicative in electrical terms of the displacement of the gap from the center position. This measurement is accomplished by connecting one electrical terminal to the mercury at a point or points on the capillary loop equidistant from the center point of the straight portion. Another electrical terminal is connected to a metal cylinder encircling the straight portion of the tube. This cylinder functions as the second plate for each of the two capacitors having a plate formed by a portion of the mercury. The current passed by each of these two capacitors is proportional to the length of the mercury column forming one plate thereof. By a judicious selection of circuit components to achieve a linear response, an electric circuit between these two terminals may provide an output whose magnitude is an indication of the displacement of the gap from the center position.

Therefore, it is a feature of this invention that an integrating accelerometer comprise a closed tube having a straight capillary portion in which a conductive fluid is confined, the displacement of the fluid in the capillary portion being measured and indicating the sum of the accelerative components.

It is a further feature of this invention that the conductive fluid confined by the tube define with at least one portion of the tube an evacuated space. More specifically, in accordance with one specific illustrative embodiment of this invention and in accordance with a more specific feature of this invention, an integrating accelerometer employs a continuous loop of capillary tube having a straight capillary portion and filled with an electric conducting fluid except for one gap in the straight portion.

Another feature of this invention in which the fluid employed in the accelerometer is an electrical conductor is an electrical arrangement for continuously indicating the position of the gap in the fluid relative to a zero position in the tube.

Another feature ancillary to the electrical indicating means of this invention is a transformer coupling for inducing electric currents in the conductive fluid itself.

A further feature is a metal cylinder surrounding the straight portion of the tube for detecting the gap position in electrical terms by a capacitance coupling.

The invention and its further objects and features will be more fully ascertained from the following description taken in connection with the drawing, in which.

Figure 1:
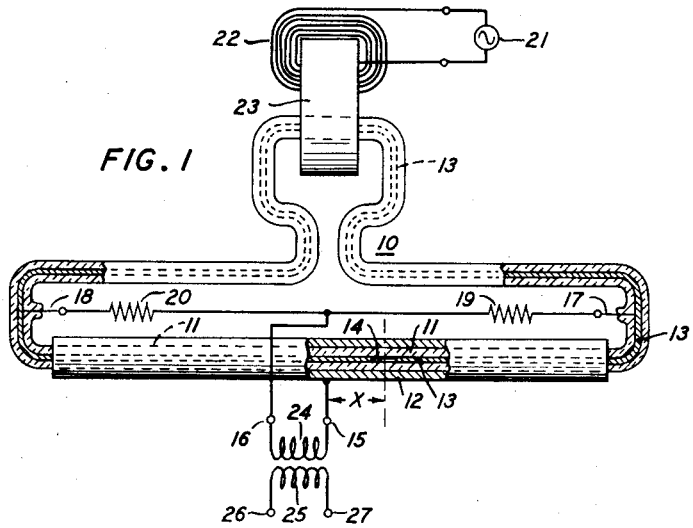
Fig. 1 is a schematic representation partially in section of an integrating accelerometer in accordance with one specific embodiment of this invention.

As shown in Fig. 1, one specific illustrative form of integrating accelerometer in accordance with this invention comprises a glass tube 10 in the form of a continuous closed loop and having a straight capillary portion 11. Enclosing the straight portion 11 is a conductive cylinder 12 which forms a part of the electrical indicating circuit. The tube 10 is filled with an electric conducting fluid 13, for example mercury, except for a small gap 14 shown in the sectioned portion of the figure.

To enable an electrical indication of the relative gap position an electrical current is induced in the mercury column by means of the primary winding 22 which is linked by means of the iron core 23 to the mercury column 13. When the winding 22 is excited from the alternating current source 21 the mercury column 13 functions as a one turn secondary of a transformer.

The circuit for indicating the position of the gap 14 relative to the center of the straight portion 11 of the tube comprises the terminals 17 and 18 connected through the averaging resistors 19 and 20 to the terminal 16 and the cylinder 12 connected to the terminal 15. The terminals 17 and 18 are connected to the mercury column 13 at points roughly equidistant from the center of the straight portion of the tube. Thus, when the gap is at the center point or zero the length of the mercury column enclosed by the cylinder 12 on one side of the gap is equal to the length enclosed by the cylinder 12 on the other side of the gap.

Figure 2:
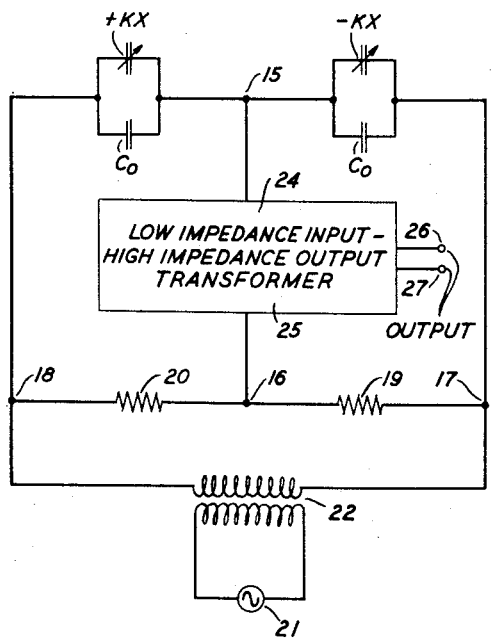
Fig. 2 is an equivalent circuit diagram of the instrumentation circuit of Fig. 1.

Electrically, the cylinder 12 is a plate common to two capacitors in which the other plate of each capacitor is composed of the length of mercury enclosed by the cylinder 12 on either side of the gap. As shown in the equivalent circuit diagram of Fig. 2 these two capacitors may be represented as a fixed capacitance and a variable capacitance in parallel. The variable capacitances are represented as $+kx$ and $-kx$, where $x$ is the displacement of the gap from the center or zero point and $k$ is a constant which relates the capacitance variation to the motion of the gap. The difference in sign indicates that the capacitance between the right-hand limb of mercury and the cylinder 12 decreases when the gap moves to the right, while the capacitance between the left-hand limb of mercury and the cylinder increases. The total current into the cylinder will be the net difference between that in each loop and will vary linearly with $x$, the displacement of the gap, if the resistance of the branch 14–16 is sufficiently small, in effect, constituting a short circuit. Thus, if the gap is centered, the currents are exactly equal and cancel each other.

In order to achieve this short circuit condition and at the same time extract an electrical output signal of a magnitude useful in measuring the gap displacement, a transformer having a primary winding 24 and secondary winding 25 is connected between terminals 15 and 16. This transformer should have a high step-up ratio to provide a low impedance input and a high impedance output. The output voltage taken across terminals 26—27 will be high and suitable for amplification by electronic means. Thus, displacement of the gap from the center position produced by accelerative components parallel to the axis of the straight portion 11 of the capillary tube, is indicated by the output voltage across terminals 26—27 with a sense, relative to the excitation voltage of primary 22, depending upon the direction of displacement of the gap.

The following derivation of the equation of motion of the mercury column illustrates the forces acting on the fluid column which are: ($a$) flotation force $F_a$ as a result of acceleration or gravity; ($b$) frictional retarding force $F_b$ as a result of the viscosity of the fluid, and ($c$) inertial reaction force $F_c$ resulting from the fluid mass. The flotation force is $$F_a = \text{(pressure unbalance)}\,\text{(area)}$$
$$= (\rho a \Delta)(\pi r^2) \quad (1)$$

where $a$ is the component of acceleration parallel to the accelerometer axis, $r$ is the radius of the bore of the straight portion of the tube, $\rho$ is the density of the fluid, and $\Delta$ is the gap length.

The frictional force, given by Poiseuille's Law, is $$F_b = \text{(pressure difference)}\,\text{(area)}$$
$$= \text{(volume/sec)}\,(8L\eta/\pi r^4)\,(\pi r^2)$$
$$= \left(\frac{dx}{dt}\pi r^2\right)(8L\eta/\pi r^4)(\pi r^2)$$
$$= \frac{dx}{dt}(8L\eta\pi) \quad (2)$$

where $L$ represents the length of the mercury column, and $\eta$ represents the viscosity of the fluid.

The inertia reaction force is $$F_c = \text{(mass)}\,\frac{d^2x}{dt^2} = (\rho L \pi r^2)\frac{d^2x}{dt^2} \quad (3)$$

The equation of motion is obtained by setting the sum of the frictional and inertial reaction forces equal to the flotation force.

$$(\rho L \pi r^2)\frac{d^2x}{dt^2} + 8L\eta\pi\frac{dx}{dt} = (\rho a \Delta)(\pi r^2) \quad (4)$$

or $$\frac{d^2x}{dt^2} + b\frac{dx}{dt} = ka \quad (5)$$

where $$b = (8\eta/\rho r^2)$$

and $$k = (\Delta/L)$$

If the gap is at rest at the center position ($x=0$), and a sudden constant acceleration $a$ is applied, then the solution of Equation 5 is $$x(t) = \frac{k}{b}\left[at - \frac{a}{b}(1 - e^{-bt})\right]$$

Figure 3:
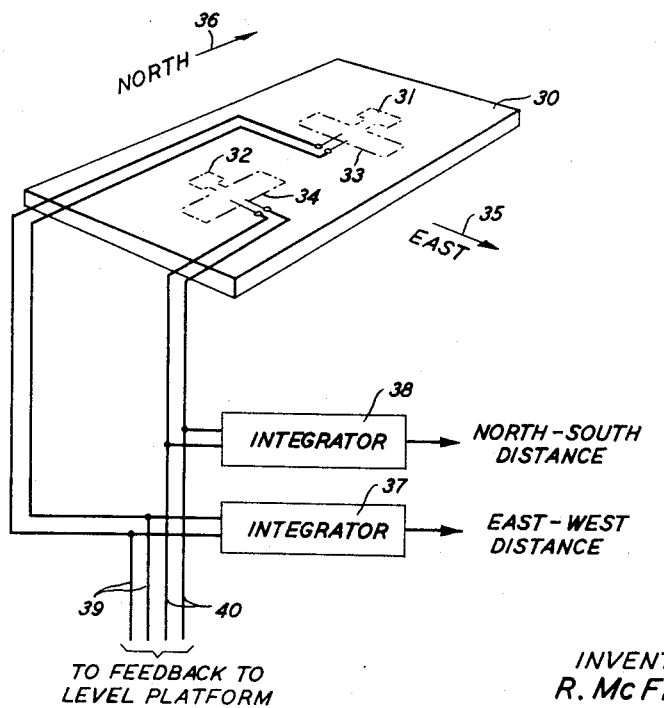
Fig. 3 is a diagrammatic representation of one application of this invention to an inertial navigation system.

Fig. 3 shows schematically one form of application of the accelerometer of this invention. The platform 30 may be considered as mounted in a moving vehicle, for example, an aircraft. Other means, not shown, maintain the platform in a level attitude relative to the surface of the earth. Two accelerometers 31 and 32 are represented in dotted outline as mounted on the platform 30 with their straight sections 33 and 34 in the same plane but with mutually perpendicular axes. As indicated by the directional arrows 35 and 36 the accelerometers will indicate the integral sums of acceleration components in the north-south and east-west directions. The output of each accelerometer is fed to integrators 37 and 38 which determine the total north-south and east-west distance traversed by the vehicle in accordance with inertial navigation techniques known to the art. The output of the accelerometers 31 and 32 is also fed back as indicated by the leads 39 and 40 to other apparatus, not shown, for generating an output to maintain the platform in the level attitude as noted heretofore.

Figure 4:
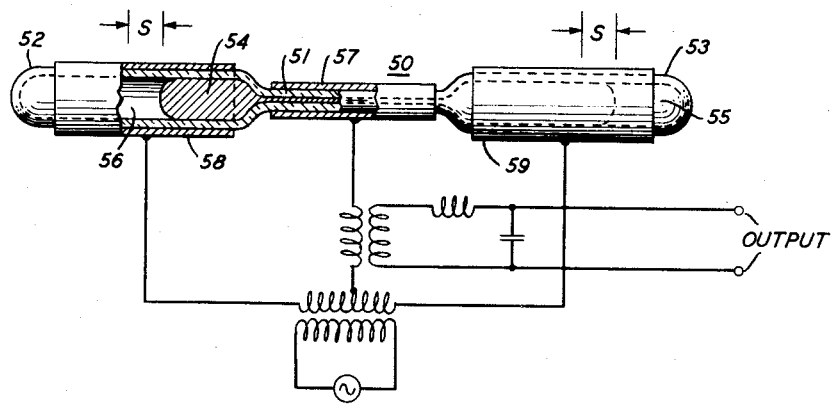
Fig. 4 is a representation, partially in schematic form, of another embodiment in accordance with this invention.

A further embodiment of this invention is shown in Fig. 4 and comprises a glass tube 50 having a central capillary portion 51 and wider diameter, straight end portions 52 and 53. The tube is partially filled with a continuous column of mercury 54, leaving evacuated sections 55 and 56 at each end. In this embodiment the mercury mass is the counterpart of the gap in the mercury column of the embodiment of Fig. 1. Hence, the integral sum of the applied accelerations in a direction parallel to the axis of the tube may be ascertained by measuring the movement of the mercury 54 from a given reference point, for example, by the dimensions $s$ taken along the straight portions 52 and 53.

Instrumentation similar in character to that of the embodiment previously described and employing capacitive coupling through metallic sleeves 57, 58, and 59 surrounding the tube may be used to produce an electrical indication of the displacement of the mercury column. However, because of the tendency of the fluid mass to undergo turbulence and to break-up at higher flow rates when passing from the capillary section 51 into either bulbous portion, this embodiment suffers from reduced accuracy at accelerations in excess of one gravitational unit. There are, however, many applications in which this limitation is not prohibitive and in which the greater compactness of this embodiment is advantageous.

It will be apparent that the accelerometer of this invention may be applied to other uses where the integral product of sucessively or continually applied accelerations is required.

Although two specific embodiments of the invention have been shown and described, it will be understood that they are but illustrative and that various modifications may be made therein without departing from the spirit and scope of the invention.

What is claimed is:

An integrating accelerometer comprising a flat coil of glass tubing having a small loop section and a large loop section, said large loop section having a straight capillary portion, a continuous column of mercury in said tubing except for a gap in said straight portion, a wire coil member electrically excited by alternating current, an iron core member linking said coil member and said small loop section thereby to induce an alternating current in said mercury column, a pair of terminal electrodes on said large loop section mounted through said tubing and connected to said mercury column at points outside of said straight capillary portion, each said point being equidistant from an end of said straight portion, thereby defining two legs of said mercury column between said terminal electrodes and said gap, and means for electrically measuring the differences in the length of said two legs, said means comprising a metal sheath surrounding said straight portion of said tubing and circuit means connecting said sheath to said terminal electrodes.

References Cited in the file of this patent

UNITED STATES PATENTS

| | | |
|---|---|---|
| 2,591,921 | Cosgriff et al. | Apr. 8, 1952 |

FOREIGN PATENTS

| | | |
|---|---|---|
| 404,799 | Germany | Oct. 23, 1924 |
| 131,184 | Great Britain | Aug. 21, 1919 |
| 610,750 | Great Britain | Oct. 20, 1948 |
| 626,217 | Great Britain | July 12, 1949 |
| 708,228 | Great Britain | Apr. 28, 1954 |